(12) United States Patent
Liao

(10) Patent No.: US 6,227,332 B1
(45) Date of Patent: May 8, 2001

(54) STRUCTURE FOR CHANGING OLD ENGINE OIL IN TRANSMISSION CASE BY AUTOMATIC CIRCULATION MECHANISM

(76) Inventor: Bo-Lin Liao, 128, Chung-Mei St., West Dis., Taichung (TW)

( * ) Notice: Subject to any disclaimer, the term of this patent is extended or adjusted under 35 U.S.C. 154(b) by 0 days.

(21) Appl. No.: 09/356,361

(22) Filed: Jul. 19, 1999

(51) Int. Cl.[7] ................................. F16C 3/14; F16N 7/30; B65B 1/04
(52) U.S. Cl. ............................. 184/1.5; 184/55.1; 141/86
(58) Field of Search ..................................... 184/1.5, 55.1; 123/196 R, 196 A; 141/126, 86, 127; 137/565.19

(56) References Cited

U.S. PATENT DOCUMENTS

| | | | |
|---|---|---|---|
| 3,837,432 | * | 9/1974 | McKendrick .................. 184/55.1 X |
| 4,128,140 | * | 12/1978 | Riches ................................... 184/1.5 |
| 4,527,580 | * | 7/1985 | Chheda ........................ 137/565.19 X |
| 5,349,992 | * | 9/1994 | Gallo et al. ......................... 141/86 X |
| 5,472,064 | * | 12/1995 | Viken ............................... 184/55.1 X |
| 5,964,256 | * | 10/1999 | Bedi et al. ........................ 184/1.5 X |
| 6,065,567 | * | 5/2000 | Camacho et al. ..................... 184/1.5 |

FOREIGN PATENT DOCUMENTS

562832 * 12/1957 (FR) ..................................... 184/1.5

* cited by examiner

*Primary Examiner*—Charles A Marmor
*Assistant Examiner*—Roger Pang
(74) *Attorney, Agent, or Firm*—Bacon & Thomas, PLLC

(57) ABSTRACT

A structure for changing engine oil in the transmission case of the engine of a motor vehicle comprises a low pressure oil cylinder and a high pressure automatic throttle valve. The change of engine oil is attained by an oil-changing loop of the automatic circulation system.

2 Claims, 7 Drawing Sheets

US 6,227,332 B1

STRUCTURE FOR CHANGING OLD ENGINE OIL IN TRANSMISSION CASE BY AUTOMATIC CIRCULATION MECHANISM

FIELD OF THE INVENTION

The present invention relates generally to a structure for replenishing a transmission case with fresh engine oil, and more particularly to a structure for draining old engine oil in the transmission case by an automatic circulation mechanism.

DESCRIPTION OF THE PRIOR ART

The conventional way for changing the engine oil in a transmission case is to open up the inlet and the outlet of the transmission case so as to enable the old engine oil in the transmission case to be drained via the outlet by atmospheric pressure. Such a conventional way for changing the engine oil as described above is defective in design, in that the old engine oil can not be completely drained out of the transmission case, and that the old engine oil residue is attached to the inner wall of the transmission case. In order to overcome such deficiencies as described above, an improved structure was introduced to the market place. The improved structure includes a pump by means of which a suction effect is brought about to drain the old engine oil in the transmission case. The new engine oil is then injected into the transmission case by re-circulating the old engine oil through a re-circulation system which is provided with a number of one-way valves and is therefore vulnerable to damage, thereby resulting in the crack in the pipe line of the re-circulation system. As a result, the transmission case may be also damaged. In other words, the oil-changing loop of the re-circulation system is too complicated to work effectively and precisely.

SUMMARY OF THE INVENTION

The primary objective of the present invention is therefore to provide an improved structure for changing engine oil in the transmission case, which is free from the deficiencies of the conventional oil-changing structure described above.

In keeping with the principle of the present invention, the foregoing objective of the present invention is attained by an engine oil changing structure which consists essentially of a low pressure oil cylinder and a high pressure automatic throttle valve. The low pressure oil cylinder is provided with a piston which divides the low pressure oil cylinder into an upper portion (new oil area) and a lower portion (old oil area). The oil cylinder is provided at the top thereof with a new oil inlet and an air pipe which is connected serially with an air switch, an air adjusting valve and an air pressure gauge. The new oil area is provided with a new oil pipe connected therewith, whereas the old oil area is provided with an old oil pipe connected therewith. The new oil pipe and the old oil pipe are controlled by an oil passage switch, which is connected with a first oil pipe which is in turn connected with an oil distributing valve. The oil distributing valve is connected with the high pressure automatic throttle valve and a second oil pipe which is connected serially with a first oil meter and an oil filter bud. A third oil pipe is connected with an oil pressure gauge. A fourth oil pipe is connected serially with the high pressure throttle valve and a three-way valve which is connected at one end thereof with an oil replenishing tank, and at other end thereof with a second oil meter. The new oil pipe is connected with another three-way valve.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE PREFERRED EMBODIMENT

Figure 1:
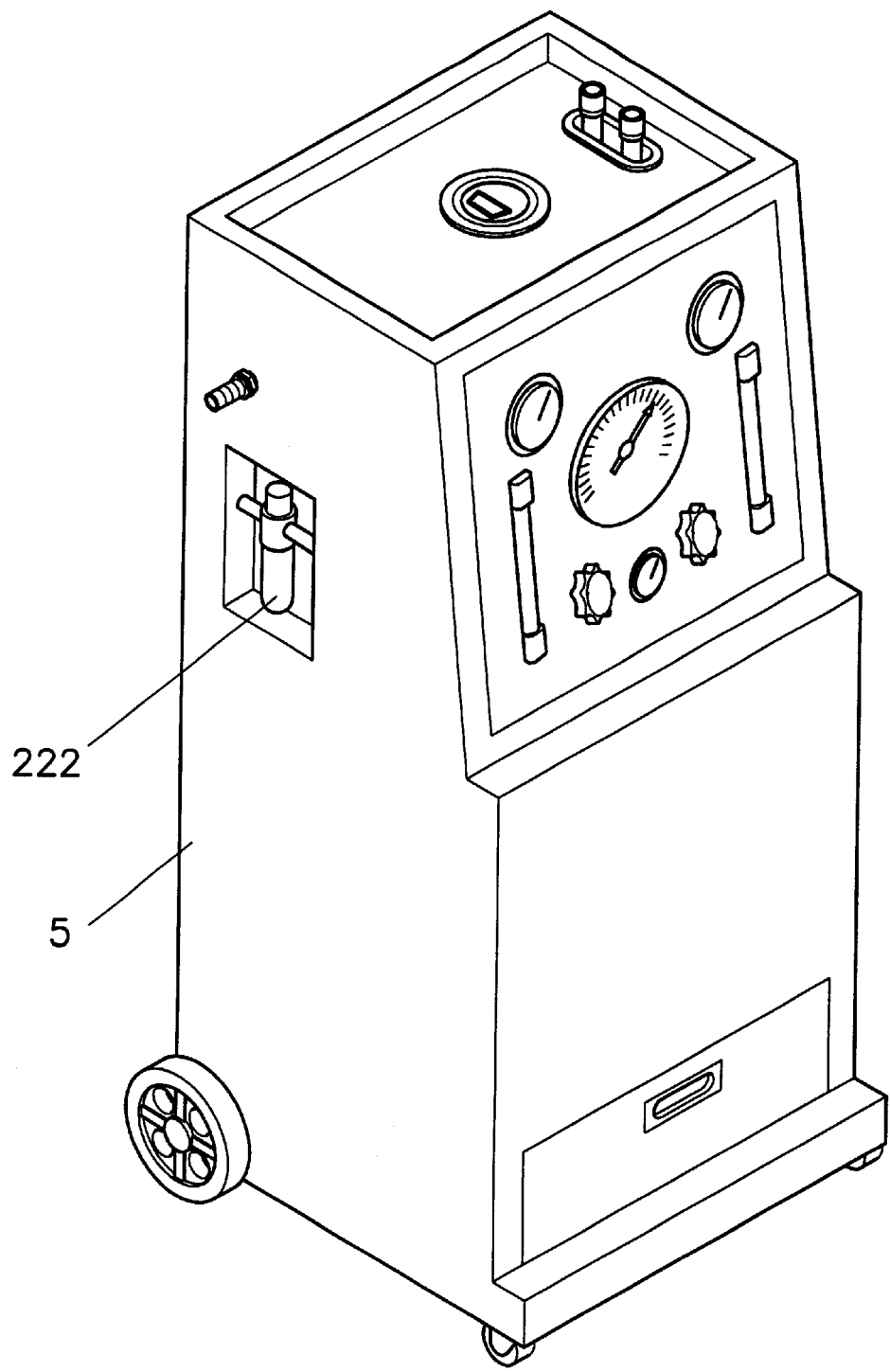
FIG. 1 shows a perspective view of the preferred embodiment of the present invention.
Figure 2:
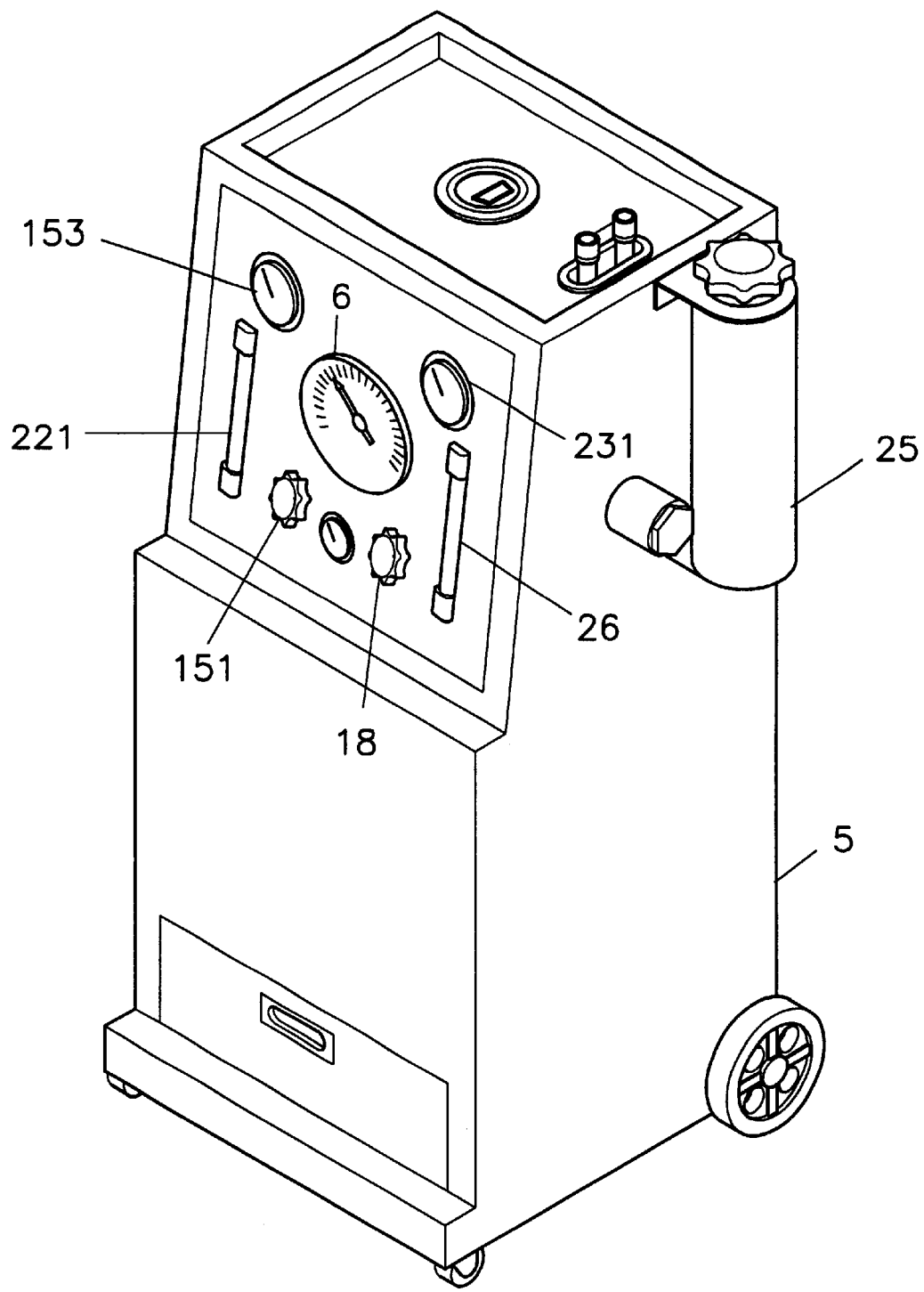
FIG. 2 shows another perspective view of the preferred embodiment of the present invention.
Figure 3:
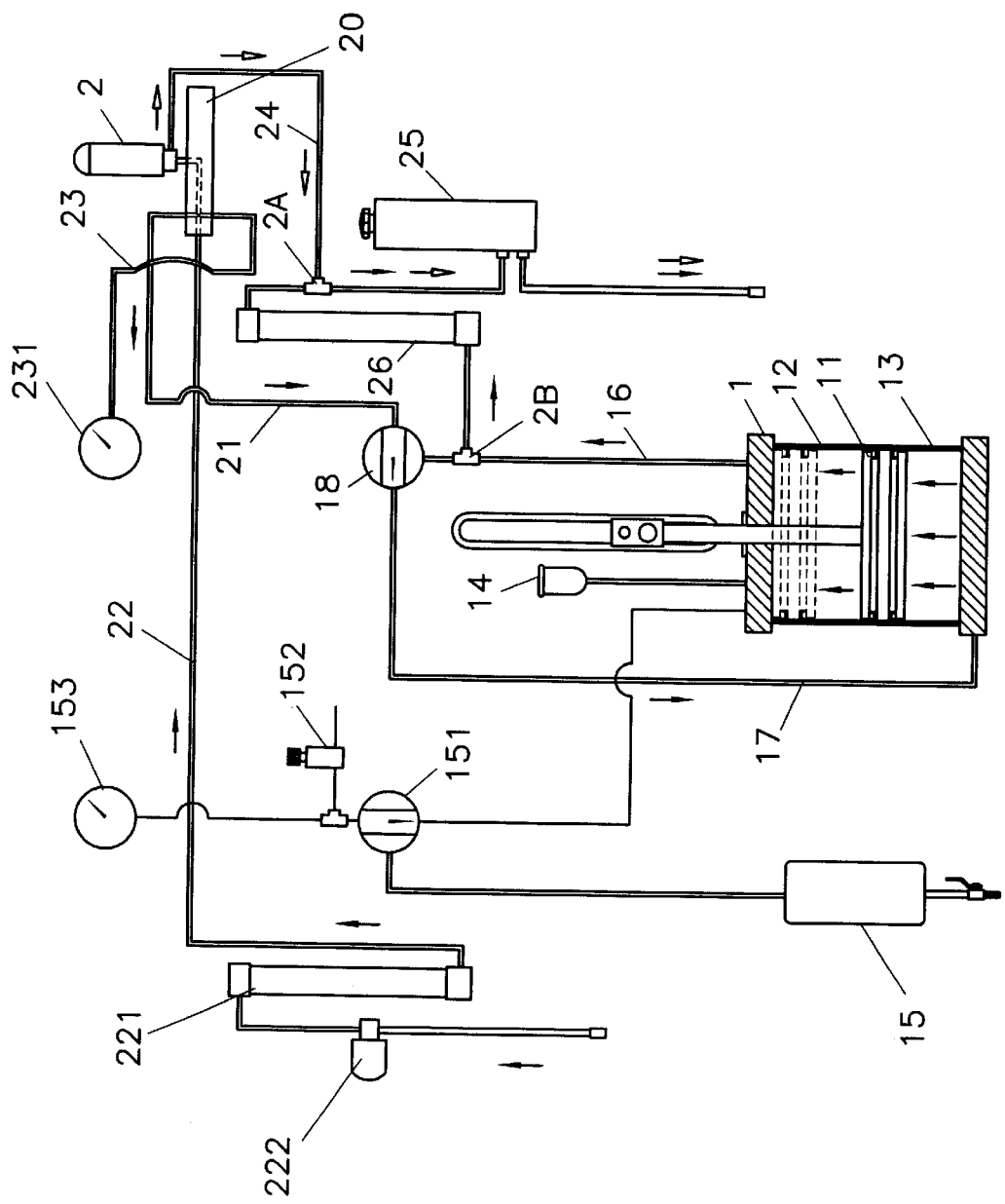
FIG. 3 shows a schematic view of the internal piping and the automatic oil changing loop of the present invention.

As shown FIGS. 1–3, an engine oil changing structure of the present invention comprises a low pressure oil cylinder 1 and a high pressure automatic throttle valve 2.

The low pressure oil cylinder 1 is provided with a piston 11 which divides the low pressure oil cylinder 1 into an upper portion 12 (new oil area) and a lower portion 13 (old oil area). The piston 11 has a V-shaped end, as shown by A—A in FIG. 6 and by B—B in FIG. 7. As a result, the contact area of the piston 11 with the inner wall of the low pressure oil cylinder 1 is reduced. Accordingly, the mechanical friction between the piston 11 and the low pressure oil cylinder 1 is minimized. The oil cylinder 1 is provided at the top thereof with a new oil inlet 14 and an air pipe 15 which is serially connected with an air switch 151, an air adjusting valve 152, and an air pressure gauge 153. The new oil area 12 is provided with a new oil pipe 16 connected therewith, whereas the old oil area 13 is provided with an old oil pipe 17 connected therewith. The new oil pipe 16 and the old oil pipe 17 are controlled by an oil passage switch 18.

The oil passage switch 18 is connected with a first oil pipe 21 which is in turn connected with an oil distributing valve 20. The oil distributing valve 20 is connected with the high pressure automatic throttle valve 2 and a second oil pipe 22 which is serially connected with an oil meter 221 and an oil filtering bud 222. A third oil pipe 23 is connected with an oil pressure gauge 231. A fourth oil pipe 24 is connected serially with the high pressure throttle valve 2 and a first three-way valve 2A which is connected at one end thereof with an oil replenishing tank 25, and at other end thereof with another oil meter 26. The new oil pipe 16 and the oil meter 26 are connected via a second three-way valve 2B.

In operation, the second oil pipe 22 is connected with the oil draining outlet of the transmission case of the engine, whereas the fourth oil pipe 24 is connected with the oil injecting inlet of the transmission case of the engine. Thereafter, the engine of the motor vehicle is started, thereby resulting in the old engine oil being forced by the power of the engine in operation to flow into the second oil pipe 22 and then eventually into the old oil area 13 of the low pressure oil cylinder 1 via the oil distributing valve 20, the first oil pipe 21, the oil passage switch 18, and the old oil pipe 17. The new oil in the new oil area 12 is forced into the transmission case of the engine via the new oil pipe 16, the second three-way valve 2B, the second oil meter 26, the fourth oil pipe 24, and the oil replenishing tank 25. As the oil-changing process is in progress, the old oil area 13 of the oil cylinder 1 is eventually filled with the old oil which is drained out of the transmission case of the engine, thereby resulting in the pressure buildup which cause the high pressure automatic throttle valve 2 to open so as to enable the old oil to flow through to enter the fourth oil pipe 24, the oil replenishing tank 25, and the engine, As a result, the pressure equilibrium is attained.

Figure 4:
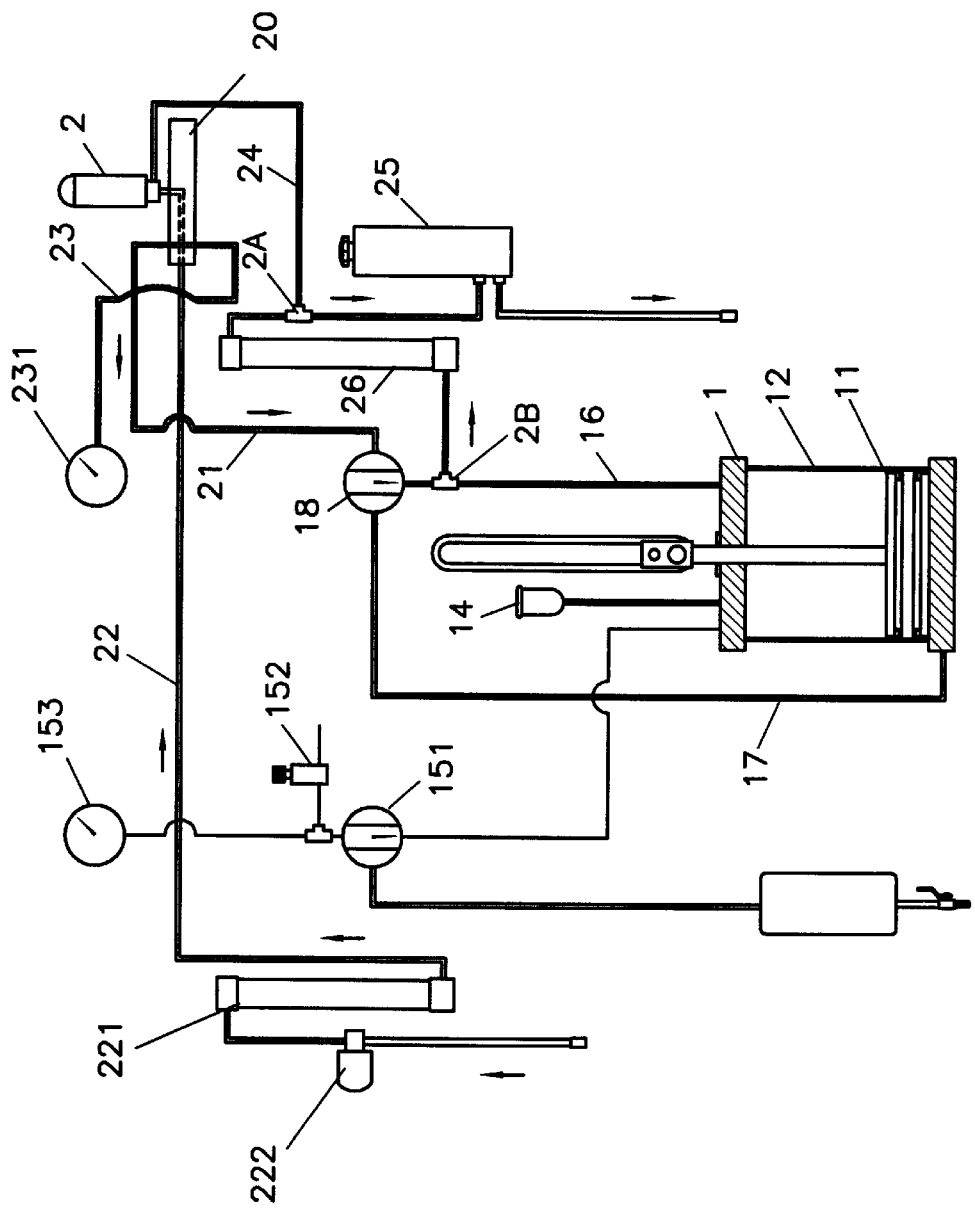
FIG. 4 shows a schematic view of the old oil cleaning and filtering loop of the present invention.

As shown in FIG. 4, the old oil may be recycled by removing the impurities in the old oil. In operation, the new oil area 12 of the low pressure oil cylinder 1 is filled with the new oil, whereas the old oil is completely drained out of the old oil area 13 such that the old oil is guided through the second oil pipe 22, the oil filtering bud 222, the first oil meter 221, the first oil pipe 21, the oil passage switch 18, the second oil meter 26, and the oil replenishing tank 25. The filtered oil is finally guided back into the transmission case of the engine.

Figure 5:
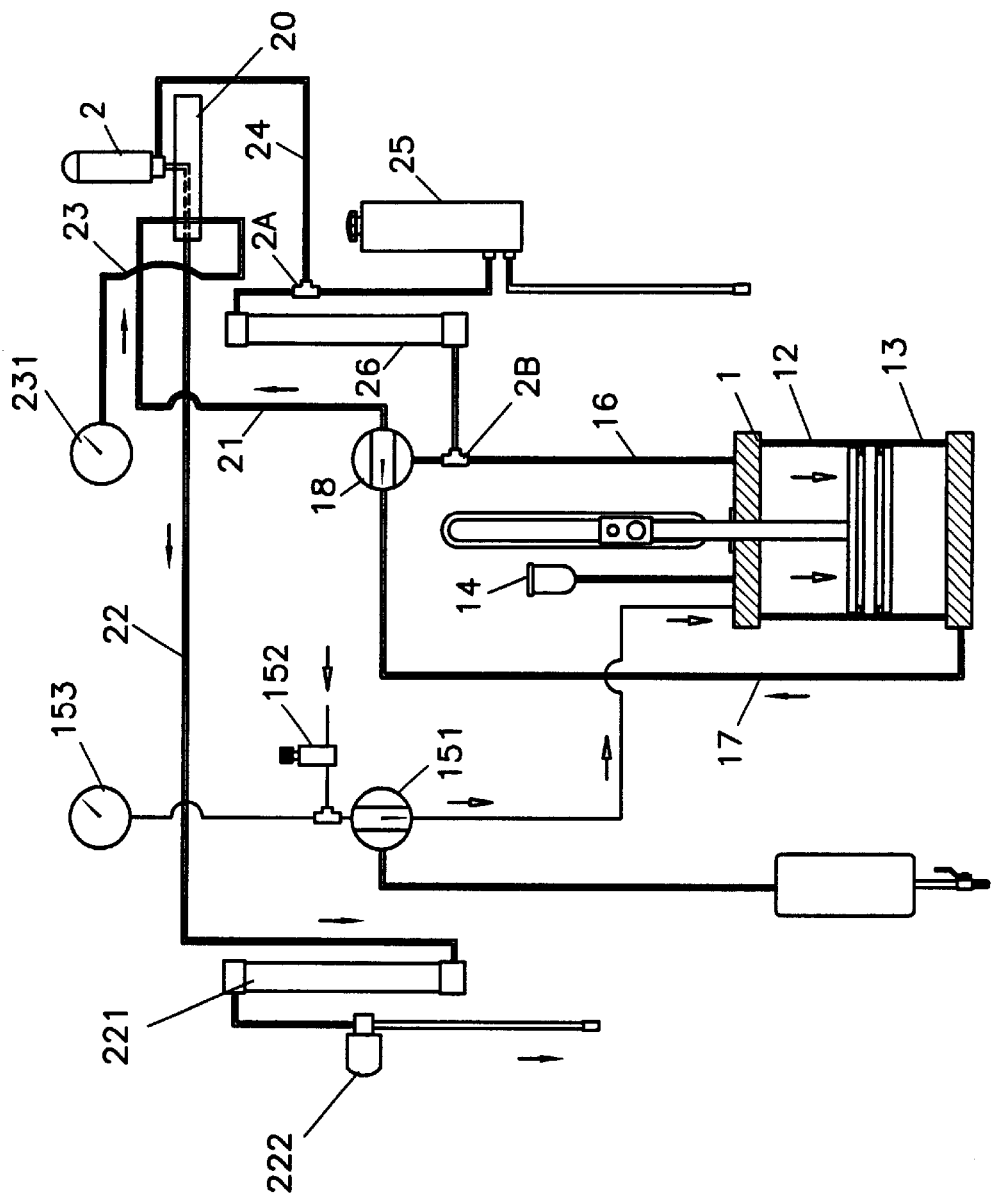
FIG. 5 shows a schematic view of the oil draining loop of the present invention.

As shown in FIG. 5, the old in the low pressure oil cylinder 1 may be completely drained out. In operation, air is pumped into the new oil area 12 of the low pressure oil cylinder 1 via the air pipe 15, thereby causing the piston 11 to descend so as to force the old oil in the old oil area 13 out of the old oil area 13. The old oil is guided through the old oil pipe 17, The oil passage switch 18, the first oil pipe 21, the second oil pipe 22, the second oil meter 221, and the oil filtering bud 222. The old oil is finally discharged.

Figure 6:
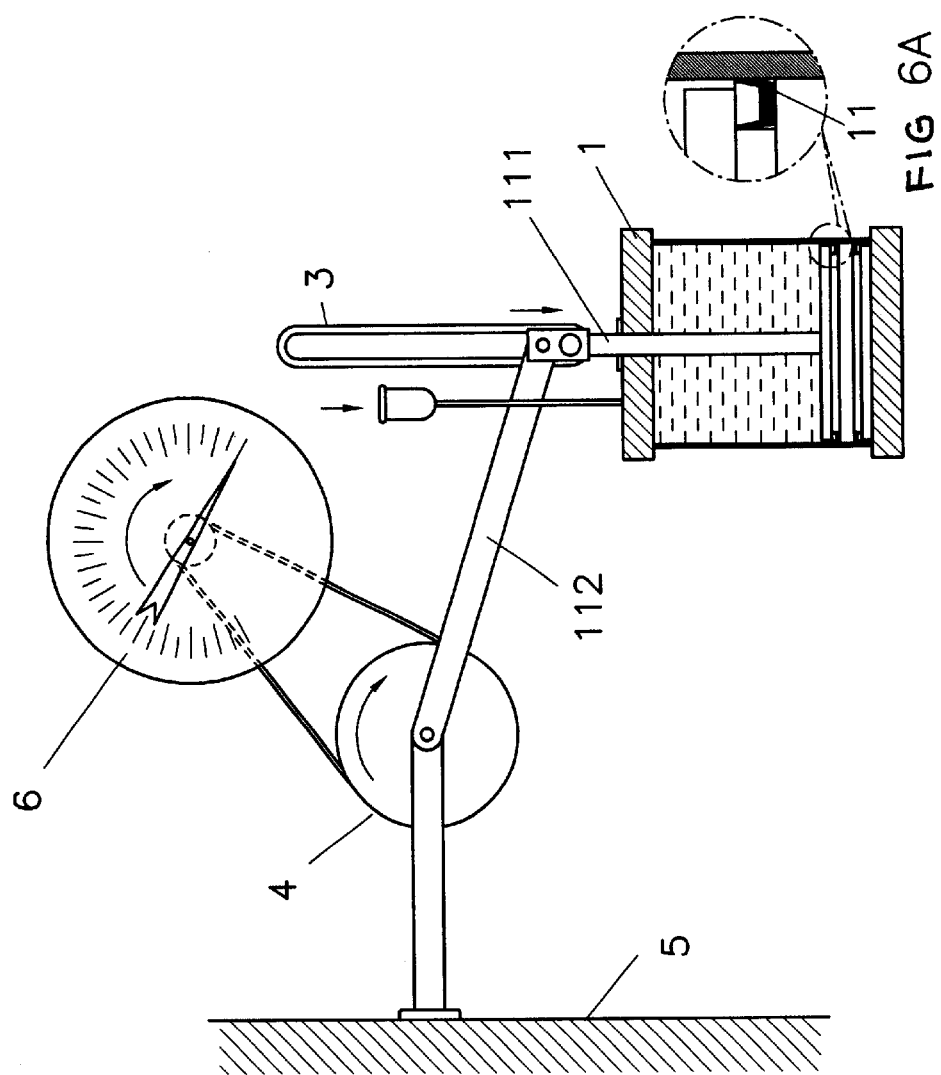
FIG. 6 shows a schematic view of a graduation dial of the present invention at work.
Figure 7:
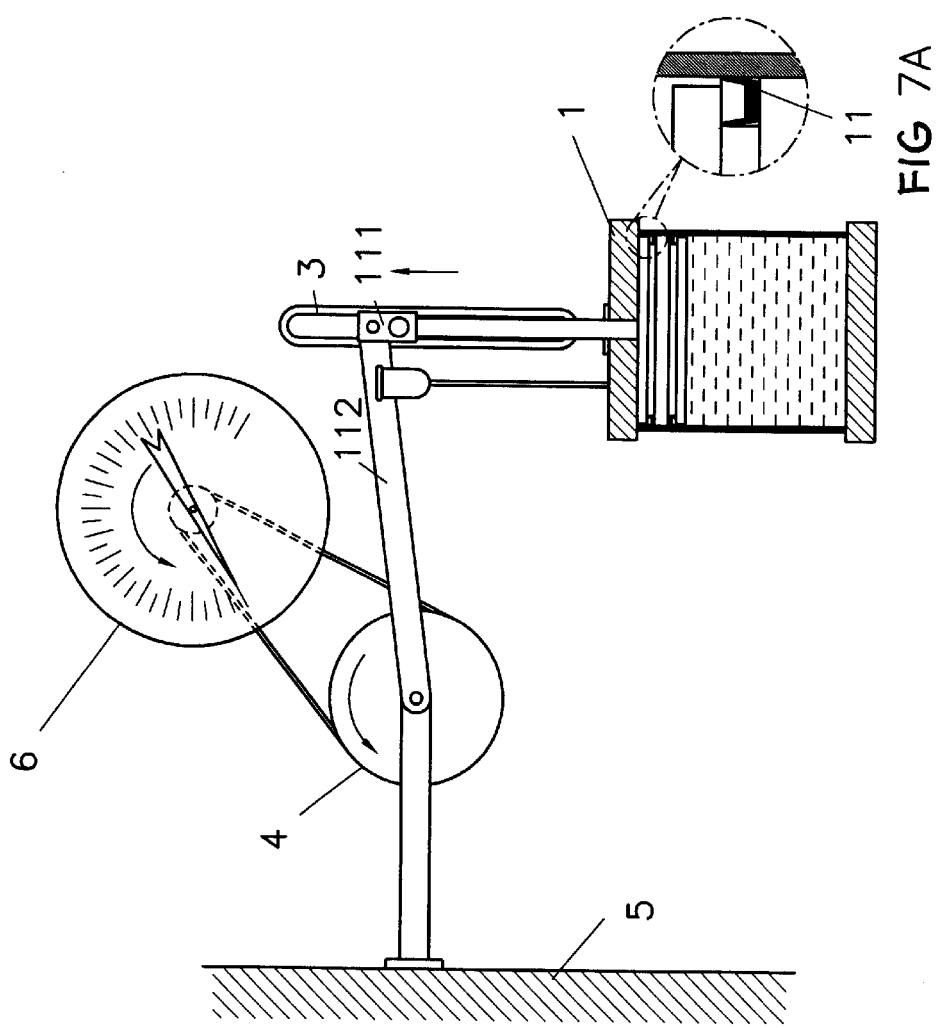
FIG. 7 shows another schematic view of the graduation dial of the present invention at work.

As shown is FIGS. 6 and 7, the present invention is provided with a graduation dial 6 for displaying the ratio of the new oil to the old oil in the low pressure oil cylinder 1 so as to assist the operator of the present invention to understand the status of the oil changing operation. The piston 11 of the low pressure oil cylinder 1 is provided at the top end thereof with a slide rod 111 connected therewith such that the slide rod 111 slides on a slide rail 3 and that the slide rod 111 is connection with a connection rod 112 which is fastened at other end thereof with a rotary disc 4 of a machine platform 5. The rotary disc 4 is linked with a pointer of the graduation dial 6 by a transmission belt or chain. As the piston 11 moves up and down, the slide rod 111 ascends and descends accordingly to actuate the rotary disc 4 to turn. As a result, the pointer is actuated to show the operator the ratio between the new oil and the old oil.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

I claim:

1. A structure for changing engine oil in the transmission case, said structure comprising a low pressure oil cylinder provided therein with a piston dividing said oil cylinder into a new oil area and an old oil area whereby said piston has a v-shaped end, said oil cylinder further provided at a top thereof with a new oil inlet and an air pipe connected serially with an air switch, an air adjusting valve and an air pressure gauge, said new oil area provided with a new oil pipe connected therewith, said old oil area provided with an old oil pipe connected therewith whereby said new oil pipe and said old oil pipe are controlled by an oil passage switch which is connected with a first oil pipe which is in turn connected with an oil distributing valve whereby said oil distributing valve is connected with a high pressure automatic throttle valve and a second oil pipe which is serially connected with a first oil meter and an oil filtering bud, said structure further comprising a third oil pipe connected with an oil pressure gauge, and a fourth oil pipe connected serially with said high pressure throttle valve and a first three-way valve which is connected at one end thereof with an oil replenishing tank, and at other end thereof with a second oil meter, said structure further comprising a second three-way valve connected with said new oil pipe of said new oil area of said oil cylinder.

2. The structure as defined in clam 1, wherein said piston of said low pressure oil cylinder is provided at a top end thereof with a slide rod which is slidably mounted on a slide rail and is connected with a connection rod whereby said connection rod is fastened with a rotary disc secured to a machine platform such that said rotary disc is linked with a pointer of a graduation dial mounted on the machine platform.

\* \* \* \* \*